United States Patent
Inoue

(10) Patent No.: US 8,532,428 B2
(45) Date of Patent: Sep. 10, 2013

(54) NOISE REDUCING APPARATUS, NOISE REDUCING METHOD, AND NOISE REDUCING PROGRAM FOR IMPROVING IMAGE QUALITY

(75) Inventor: Akira Inoue, Minato-ku (JP)

(73) Assignee: NEC Corporation, Tokyo (JP)

( * ) Notice: Subject to any disclaimer, the term of this patent is extended or adjusted under 35 U.S.C. 154(b) by 1019 days.

(21) Appl. No.: 12/528,773

(22) PCT Filed: Feb. 4, 2008

(86) PCT No.: PCT/JP2008/051739
§ 371 (c)(1),
(2), (4) Date: Aug. 26, 2009

(87) PCT Pub. No.: WO2008/105222
PCT Pub. Date: Sep. 4, 2008

(65) Prior Publication Data
US 2010/0119163 A1    May 13, 2010

(30) Foreign Application Priority Data
Feb. 27, 2007    (JP) .................................. 2007-047869

(51) Int. Cl.
*G06K 9/40*    (2006.01)
(52) U.S. Cl.
USPC ........... 382/275; 382/260; 382/263; 382/264; 382/254
(58) Field of Classification Search
USPC ................. 382/199, 224, 260, 261, 273, 263, 382/264, 270, 275; 348/222.1, 234, 252; 708/300
See application file for complete search history.

(56) References Cited

U.S. PATENT DOCUMENTS

| | | | | |
|---|---|---|---|---|
| 5,337,087 A * | 8/1994 | Mishima | .................. | 375/240.04 |
| 5,907,370 A * | 5/1999 | Suzuki et al. | .................. | 348/607 |
| 6,381,373 B1 * | 4/2002 | Suzuki et al. | .................. | 382/263 |
| 6,819,717 B1 * | 11/2004 | Sasai et al. | ................. | 375/240.29 |
| 7,054,364 B2 * | 5/2006 | Kawashima | ............ | 375/240.13 |
| 7,400,775 B2 * | 7/2008 | Ikeda et al. | ................... | 382/254 |
| 7,418,132 B2 * | 8/2008 | Hoshuyama | .................. | 382/167 |
| 7,453,504 B2 * | 11/2008 | Ikeda | ........................... | 348/252 |
| 7,486,838 B2 * | 2/2009 | Kanda | .......................... | 382/275 |
| 7,787,541 B2 * | 8/2010 | Osamoto et al. | .......... | 375/240.29 |
| 7,812,868 B2 * | 10/2010 | Ikeda | ........................... | 348/252 |
| 7,876,370 B2 * | 1/2011 | Hirai | ............................ | 348/252 |
| 7,876,957 B2 * | 1/2011 | Ovsiannikov et al. | ......... | 382/167 |
| 7,983,511 B1 * | 7/2011 | Chan | ............................ | 382/275 |
| 8,059,207 B2 * | 11/2011 | Xu et al. | ....................... | 348/701 |
| 8,155,448 B2 * | 4/2012 | Ida et al. | ...................... | 382/199 |
| 8,244,054 B2 * | 8/2012 | Lin et al. | ...................... | 382/268 |
| 2002/0118887 A1 * | 8/2002 | Gindele | ........................ | 382/260 |

(Continued)

FOREIGN PATENT DOCUMENTS

| | | |
|---|---|---|
| JP | 3-054679 A | 3/1991 |
| JP | 08-237669 A | 9/1996 |

(Continued)

*Primary Examiner* — Chan S Park
*Assistant Examiner* — Mia M Thomas
(74) *Attorney, Agent, or Firm* — Sughrue Mion, PLLC

(57) ABSTRACT

A noise reducing apparatus and associated method and program for improving image quality in an image are provided. The noise reducing apparatus detects a flat area from an image and analyzes the noise from the flat area, and then it suppresses a noise component of the image based on the noise analysis result.

20 Claims, 5 Drawing Sheets

(56) References Cited

U.S. PATENT DOCUMENTS

| | | | |
|---|---|---|---|
| 2003/0138162 A1* | 7/2003 | Hirai | 382/266 |
| 2006/0082665 A1* | 4/2006 | Mizukura et al. | 348/272 |
| 2006/0158562 A1* | 7/2006 | Rhee | 348/607 |
| 2006/0251335 A1* | 11/2006 | Sugimoto | 382/275 |
| 2008/0204600 A1* | 8/2008 | Xu et al. | 348/607 |
| 2009/0226111 A1* | 9/2009 | Ida et al. | 382/266 |
| 2010/0091126 A1* | 4/2010 | Siddiqui et al. | 348/222.1 |
| 2010/0201880 A1* | 8/2010 | Iwamura | 348/573 |

FOREIGN PATENT DOCUMENTS

| | | |
|---|---|---|
| JP | 9-044654 A | 2/1997 |
| JP | 2005-275581 A | 10/2005 |
| JP | 2005-277503 A | 10/2005 |
| JP | 2006-060286 A | 3/2006 |
| JP | 2006-115268 A | 4/2006 |

* cited by examiner

| CATEGORY | Z VALUE | HUE H MAX. | HUE H MIN. | CHROMA S MAX. | CHROMA S MIN. | BRIGHTNESS V MAX. | BRIGHTNESS V MIN. |
|---|---|---|---|---|---|---|---|
| PORTRAIT | 1 | 30 | -10 | 50 | 0 | 255 | 100 |
| SCENERY | 2 | 120 | 50 | 50 | 0 | 200 | 50 |
| FLOWER | 3 | 360 | 0 | 255 | 100 | 255 | 50 |
| NIGHT VIEW | 4 | 360 | 0 | 40 | 0 | 20 | 0 |
| BACKLIGHT | 5 | 360 | 0 | 50 | 0 | 50 | 0 |

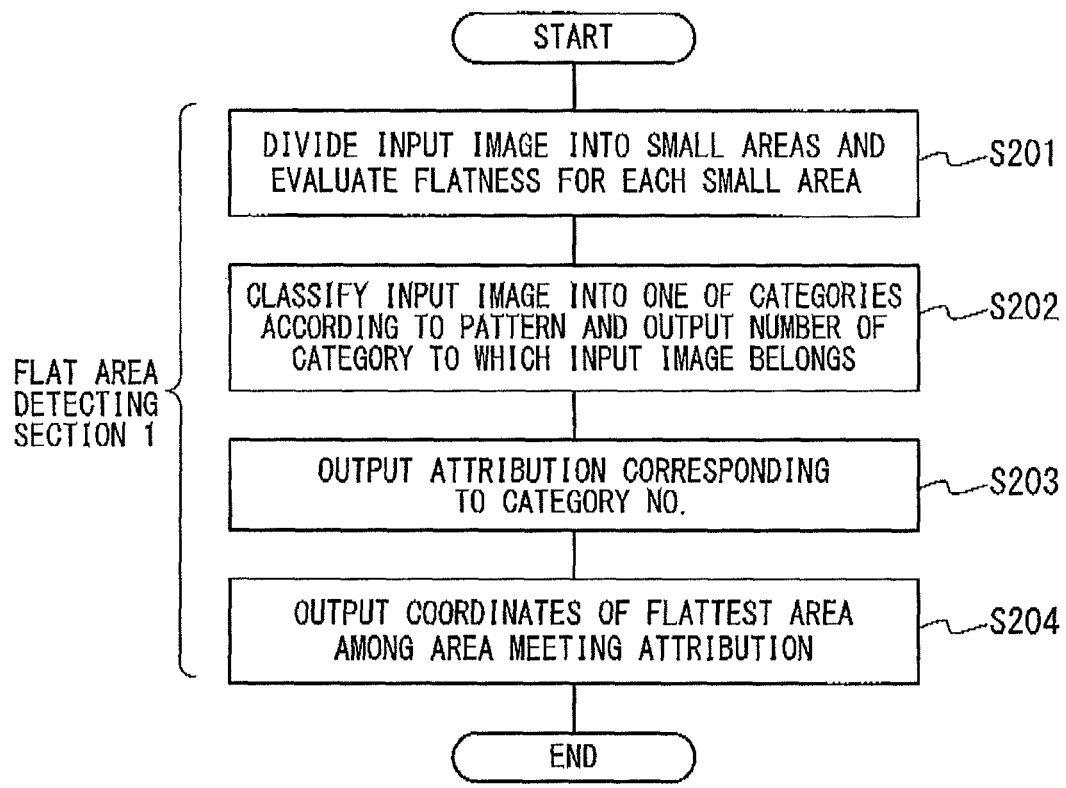

NOISE REDUCING APPARATUS, NOISE REDUCING METHOD, AND NOISE REDUCING PROGRAM FOR IMPROVING IMAGE QUALITY

TECHNICAL FIELD

The present invention relates to a noise reducing apparatus, and more specifically, to a noise reducing apparatus of improving image quality by reducing a noise of an image. It should be noted that this application claims a priority based on Japanese Patent Application No. 2007-047869. The disclosure thereof is incorporated herein by reference.

BACKGROUND ART

As noise reducing methods, there are two main methods. A first method is a method of smoothing a peripheral area of a concerned pixel. A second method is a method of detecting an edge area and dividing a process according to the detection result.

In an example of the first method, a noise reducing apparatus determines peripheral pixels to be averaged from concentration and contrast of input image data, and at the same time, determines weighting coefficients to the peripheral pixels. As a technique related to this, Japanese Patent Application Publication (JP-A-Heisei 3-054679) discloses "Image Processing Apparatus." This image processing apparatus has an averaging section for averaging input image data and peripheral pixel data, an averaging process determining section for determining the peripheral pixels to be averaged from the concentration and contrast of the input image data, a weighting calculating section for calculating weighting of the averaged data and the input image data, and a coefficient determining section for determining weighting coefficients from the concentration and contrast of the input image data.

In an example of the second method, the image processing system divides an input image into an edge area and an edge inverted area other than the edge area, an area, performs smoothing on the edge inverted area, and then combines it with the edge area. As a technique related to this, Japanese Patent Application Publication (JP-A-Heisei 09-044654) discloses "Image Processing Apparatus, Image Processing Method, Noise Eliminating Apparatus, and Noise Eliminating Method." In this related technique, an A/D converter converts an analog brightness signal into a digital brightness signal through A/D conversion, and the digital brightness signal is supplied to a differentiator, a histogram generator, and a coefficient memory. The differentiator calculates an absolute value of a first-order derivative value (derivative absolute value) of the digital brightness signal and supplies it to the histogram generator. The histogram generator counts a brightness level of a digital brightness signal, which has a smaller derivative absolute value than a predetermined threshold, among derivative absolute values, and generates a histogram of the brightness level for one screen. A histogram smoother performs smoothing on the histogram. A coefficient calculator calculates a uniform area coefficient based on the smoothed histogram, and supplies a coefficient table to the coefficient memory. The coefficient memory makes the uniform area coefficient correspond with each pixel position in a screen.

However, in a noise reducing method of assigning weight coefficients to peripheral pixels to be smoothed, there is a case where an edge becomes discontinuous or a case where the entire image is converted to an oil-painted image, which leads to a case where a subjective image quality may be spoiled.

Moreover, in a noise reducing method of detecting the edge area, there is a case where the noise cannot be fully removed because of erroneous determination of an edge pixel and a noise pixel.

The causes of these problems are in that a noise component included in an image is not estimated accurately in any noise reducing methods.

In conjunction with the above description, Japanese Patent Application Publication (JP-P2006-060286A) discloses "Block Noise Reducing Apparatus." The block noise reducing apparatus reduces a block noise in a screen where a motion of an image is very large, by executing a smoothing process for a flat area of the image in the screen. The smoothing process means to remove high spatial frequency components from an image data. Since the flat area of the image does not have high spatial frequency components originally, the image data is not lost even if the smoothing process is executed.

Moreover, Japanese Patent Application Publication (JP-P2006-115268A) discloses "Block Noise Reducing Apparatus." This block noise reducing apparatus includes a frame correlation determining section, a flat region detecting section, a high frequency region detecting section, a smoothing process section, and a processing region setting section. The frame correlation determining section determines a correlation of a decoded image signal between frames. The flat region detecting section detects as a flat region, an image region that a brightness difference between its pixels and peripheral pixels is small, among decoded image signals. The high frequency region detecting section detects as a high frequency region, an image region that includes high spatial frequency components from among decoded image signals. The smoothing process section executes the smoothing process on the decoded image signal for a predetermined region. The processing region setting section sets an image region where the smoothing process section should execute the smoothing process on the decoded image signal. At this time, the processing region setting section sets as a processing region, a region that is the flat region of the decoded image signal in a frame that has a low correlation between the frames at least and is not the high frequency region.

DISCLOSURE OF INVENTION

An object of the present invention is to provide a noise reducing apparatus which can obtain an output image with high quality by accurately estimating a noise component to be removed from an input image, and by executing an image process by use of the estimated noise component.

A noise reducing apparatus of the present invention includes a flat area detecting section for detecting a flat area from an image and outputting a coordinate value of the flat area, a noise component analyzing section for extracting a noise frequency band component by filtering a specific spatial frequency component determined in advance from the flat area, and a noise component suppressing section for suppressing a noise component according to the noise frequency band component.

A noise reducing method of the present invention includes detecting a flat area from an image, extracting a noise frequency band component by filtering a specific spatial frequency component determined in advance from the flat area, and suppressing a noise component of the image according to a noise frequency band component.

A recording medium of the present invention stores a program that makes a computer execute: detecting a flat area from an image, extracting the noise frequency band component by filtering a specific spatial frequency component determined in advance from the flat area, and suppressing a noise component of the image according to a noise frequency band component.

The noise reduction program of the present invention is a program that causes a computer execute detecting a flat area from an image; extracting a noise frequency band component by filtering a specific spatial frequency component determined in advance from the flat area, and suppressing a noise component of the image according to a noise frequency band component.

According to the present invention, it is possible to obtain a natural, noise-reduced image without producing discontinuity of a straight line and pictorial unnaturalness.

BRIEF DESCRIPTION OF DRAWINGS

FIG. 6 is a flowchart showing an operation of the second exemplary embodiment of the present invention.

BEST MODE FOR CARRYING OUT THE INVENTION

Hereinafter, a noise reducing apparatus of the present invention will be described with reference to the attached drawings.

Figure 1:
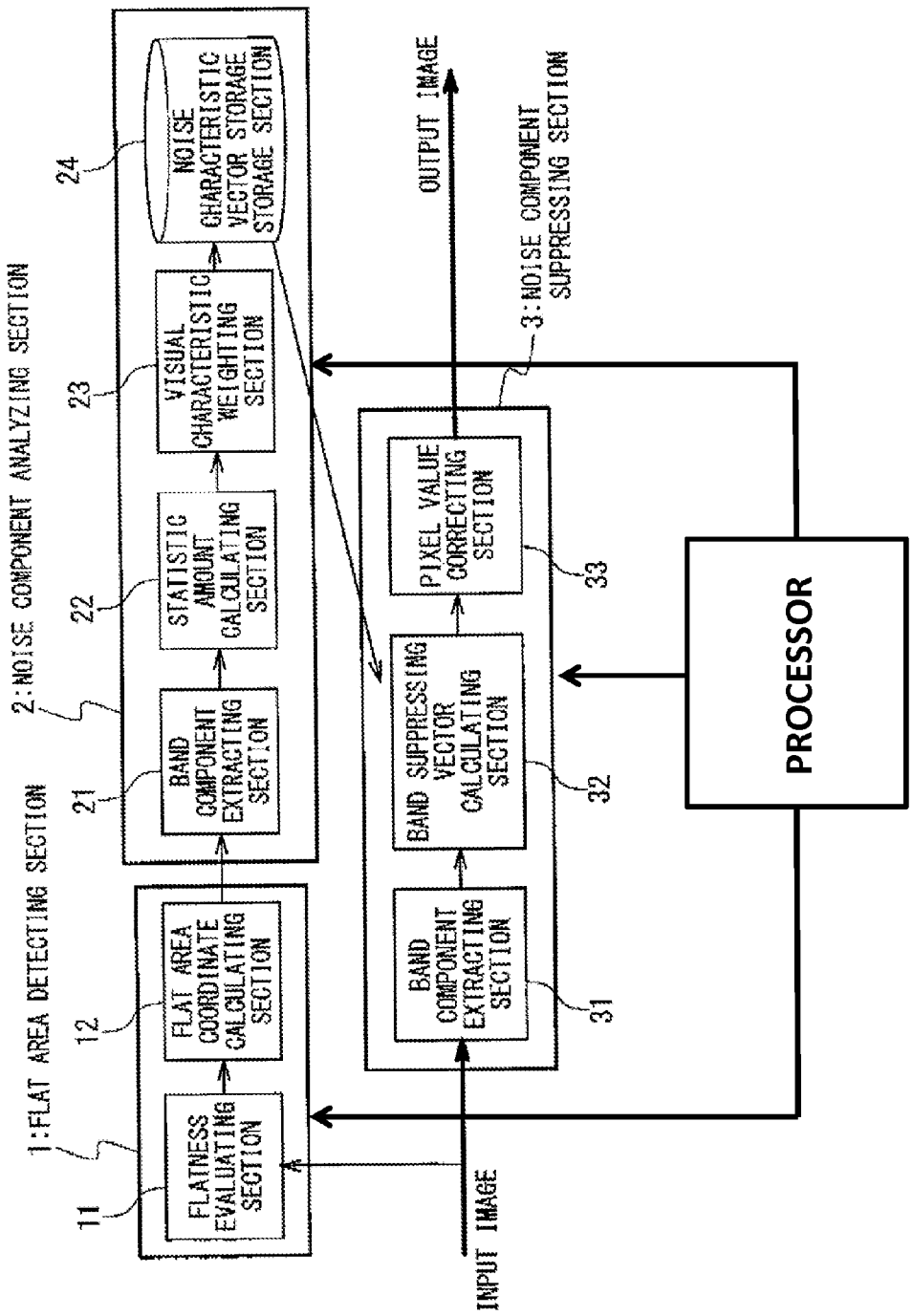
FIG. 1 is a block diagram showing a configuration of a first exemplary embodiment of the present invention.

Referring to FIG. 1, the noise reducing apparatus according to a first exemplary embodiment of the present invention includes a flat area detecting section 1, a noise component analyzing section 2, and a noise component suppressing section 3.

The flat area detecting section 1 detects a flat area that is a partial area of an input image in which a noise component should be evaluated, and outputs a coordinate value of the detected flat area. The flat area detecting section 1 includes a flatness evaluating section 11 and a flat area coordinate calculating section 12. The flatness evaluating section 11 divides the input image into several small area images, and evaluates the flatness in each of the small area images. The flatness evaluating section 11 evaluates the flatness by calculating a flatness index S indicating a degree of variation in gray scale in the area. That is, a value of the flatness index S indicates the flatness. The flat area coordinate calculating section 12 searches a flattest area based on the flatness index S, and outputs coordinates of the searched area.

As an example of a value of the flatness index S, there is a method of using a variance of pixel values in an area A. If the flatness index S calculated by using the variance of the pixel values in the area A is denoted by S1, an example of the calculation result of S1 can be expressed as the following equation (1):

$$S1 = \frac{1}{N} \sum_{(x,y) \in A} (Y(x, y) - \mathrm{mean}(Y))^2 \quad (1)$$

Here, $Y(x, y)$ expresses a brightness value at a coordinate $(x, y)$, N expresses the number of pixels in the area A, and $\mathrm{mean}(Y)$ expresses a brightness average in the area A. In case of a color image, a summation of the variances of the RGB, not the brightness value Y, may be used as the flatness index S. It should be noted that RGB is a way of expressing a color as a combination of three colors of red (R), green (G), and blue (B).

Moreover, the flatness evaluating section 11 can also calculate the flatness index S in the area A based on a difference of a brightness value between a central pixel (x0, y0) and each of peripheral pixels. When the flatness index S calculated using a difference of the brightness value between the central pixel (x0, y0) and each of the peripheral pixels is denoted by S2, an example of the calculation result of S2 can be expressed as the following equation (2):

$$S2 = \frac{1}{N} \sum_{(x,y) \in A} |Y(x0, y0) - Y(x, y)| \quad (2)$$

Moreover, the flatness evaluating section 11 can calculate the flatness index S by using a brightness histogram hist[i] in the area A. When the flatness index S calculated by using the brightness histogram hist[i] in the area A is denoted by S3, an example of the calculation result of S3 can be expressed as the following equation (3):

$$S3 = \sum_{i=0}^{255} p_i \cdot \log p_i \quad (3)$$
$$\left(p_i = \frac{1}{N} \mathrm{hist}[i]\right)$$

Here, S3 is an index called information entropy. In case of a color image, also for S2 and S3, the flatness evaluating section 11 may calculate a flatness index of each of RGB, and then calculate a summation of flatness indices of R, G, and B to use as a total flatness index.

For all of S1 to S3 described as the examples of the flatness indices, a calculated value becomes large when a degree of variation in gray scale is large. Therefore, the flattest area which the flat area coordinate calculating section 12 should search is an area where the flatness index is small. The flat area coordinate calculating section 12 outputs a coordinate value of an area where the flatness index is the smallest based on the flatness index of each small area, as a coordinate value of the flat area.

The noise component analyzing section 2 analyzes a noise component of the flat area obtained by the flat area detecting section 1, and extracts a noise characteristic vector. The noise component analyzing section 2 includes a band component extracting section 21, a statistic amount calculating section 22, a visual characteristic weighting section 23, and a noise characteristic vector storage section 24.

The band component extracting section 21 extracts a predetermined band component from the flat area by applying predetermined M frequency band filters F (m) (where, m=1, . . . , M). The extracted band components are called a band component vector. The band component vector shall include not only a frequency component but also a color component and a band component for each edge direction.

Figure 2:
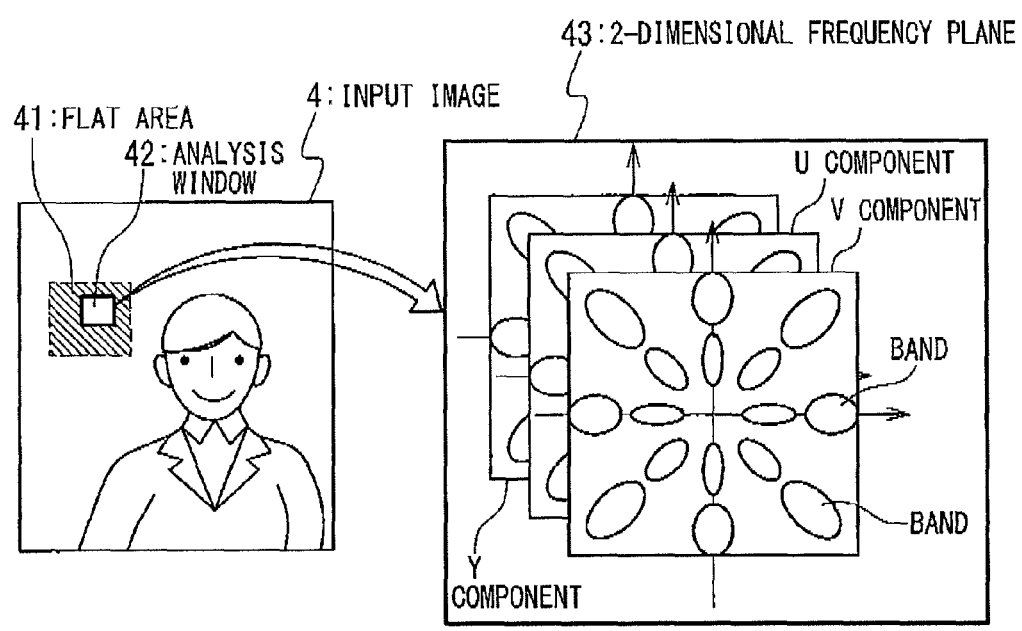
FIG. 2 is a diagram for explaining a flat area and a noise component analysis.

Referring to FIG. 2, a noise analysis on the flat area will be described. The flat area detecting section 1 detects a flat area 41 from an input image 4. The band component extracting section 21 extracts several band components by performing band filtering to remove predetermined band components on the pixel values of the flat area. The band component extracting section 21 performs the filtering for every pixel by using an analysis window 42 smaller than the flat area 41. The band component extracting section 21 generates a 2-dimensional frequency plane 43 that is converted from the analysis window 42. The 2-dimensional frequency plane 43 shows an example of a frequency band that is represented by the YUV color components. It should be noted that the YUV is a way of representing a color by three pieces of information; a brightness signal (Y), a difference (U) between the brightness signal and a blue component, and a difference (V) between the brightness signal and a red component. One example of the noise analysis method of the present invention is a method of extracting a frequency component existing in a specific band in the frequency plane and using a response value of the extracted frequency component as a noise characteristic.

Since the flat area is composed of a plurality of pixels, the band component extracting section 21 acquires as many band component vectors for the number of the pixels in the flat area. Here, it is assumed that V(l, m) (where, $1 \leq l \leq L$ and $1 \leq m \leq M$) are obtained as band components for L pixels. The statistic amount calculating section 22 will obtain a value whose absolute value is a maximum among the L values for every band and outputs the obtained maximum absolute value as a band component vector statistic amount VR. The following equation (4) shows an example of calculation of the VR;

$$VR=\{vr(m): m=1, 2, \ldots, M\}$$

$$r(m)=\max(|v(1,m)|,|v(2,m)|, \ldots, |v(L,m)|) \quad (4)$$

The visual characteristic weighting section 23 performs weighting to reflect a visual characteristic for each band. The weighting should be in a range from 0 to 1. For example, since reduction of the Y component gives adverse influence not only on noise feeling but also on resolution feeling when the visual characteristic weighting section 23 decomposes a color into a YUV color space, it reduces the weight for the Y component. On the other hand, since the visual characteristic weighting section 23 only gives small influence on resolution feeling regarding the UV components that are color components, it enlarges the weight. Moreover, there is a case where the visual characteristic weighting section 23 makes the weights small, since the noise makes a smaller contribution on a high-frequency band that exceeds a predetermined value. Moreover, since there is a case where optimal weighting may depend upon a display environment of an image as an object, the visual characteristic weighting section 23 may determine the weights based on actual evaluation by a plurality of viewers. The visual characteristic weighting section 23 outputs the noise characteristic vector FN={fn(m):m=1, 2, . . . , M} obtained by performing weights on the band vector statistics amount. The visual characteristic weighting section 23 stores the noise characteristic vector in the noise characteristic vector storage section 24.

The noise component suppressing section 3 suppresses a noise component in the input image based on a noise analysis result. The noise component suppressing section 3 includes a band component extracting section 31, a band suppression vector calculating section 32, and a pixel value correcting section 33.

The band component extracting section 31 scans an input image, and extracts a band component vector for a peripheral area of a concerned pixel. For the band filter used here, a same filter as in the band component extracting section 21 used for a noise analysis shall be used.

The band suppression vector calculating section 32 calculates the band suppression vector by comparing the band component vector in the concerned pixel and the noise characteristic vector. Here, the band suppression vector calculating section 32 calculates the band suppression vector using a value obtained by multiplying values of the band component vector in the neighborhood of the concerned pixel by a fixed value. Next, in the case where an absolute value of each element of the obtained band suppression vector exceeds a value of an element of the noise characteristic vector, the band suppression vector calculating section 32 executes a process of replacing the element of the band suppression vector with an element of the noise characteristic vector while keeping its sign as it is.

A calculation method in the band suppression vector calculating section 32 will be described. When the band suppression vector is expressed by G={g(m): m=1, 2, . . . , M}, an example of the calculation method of a suppression amount g(m) in an $m^{th}$ band can be expressed by the following equation (5);

$$g0(m) = \begin{cases} -fn(m) & \text{if } (r'(i) < -fn(i)) \\ fn(m) & \text{if } (r'(i) > fn(i)) \\ r(m) & \text{else} \end{cases} \quad (5)$$

$$g(m) = g0(m) \cdot a(m)$$

Here, a(m) is an arbitrary coefficient specified in advance, and it is often set to 1.0 or less in order to suppress a suppression amount for a specific band. For example, there is a case where an output image is reproduced with more natural texture by controlling the suppression amount of a very high frequency component and suppressing frequencies in a middle frequency band emphatically largely. Moreover, an example of calculation of r(m) is shown in the following equation (6):

$$r(m)=Y(x,y) \otimes F(m) \quad (6)$$

Here, r(m) is an $i^{th}$ band component in a concerned pixel (x, y). The band suppression vector calculating section 32 calculates r(m) as a result of convolution of a filter F(m) and an input image Y(x, y) in the coordinate (x, y). The filter F(m) is a filter for the same band as the filter used in the noise component analysis, and the same filter can be used as a filter coefficient and an arithmetic circuit. fn(m) is an element of a noise characteristic vector FN for the $m^{th}$ band. Here, the noise characteristic vector is a positive value.

The pixel value correcting section 33 subtracts the band suppression vector G={g(m): m=1, 2, . . . , M} from a value of the concerned pixel (here, Y(x, y)). An example of calculation of the pixel value correcting section 33 is shown by the following equation (7):

$$Y'(x, y) = Y(x, y) - \sum_{m=1}^{M} g(m) \quad (7)$$

Generally, as the suppression amount of a high frequency component as a noise component becomes larger, a noise reducing effect becomes higher. On the other hand, details of an edge or a minute structure become blurred. In the present invention, by estimating a frequency band component of the noise, it is possible to prevent the frequency component from being suppressed more than needed in an edge area, and to realize the noise reduction process in which the suppression amount is optimized according to the image.

Figure 3:
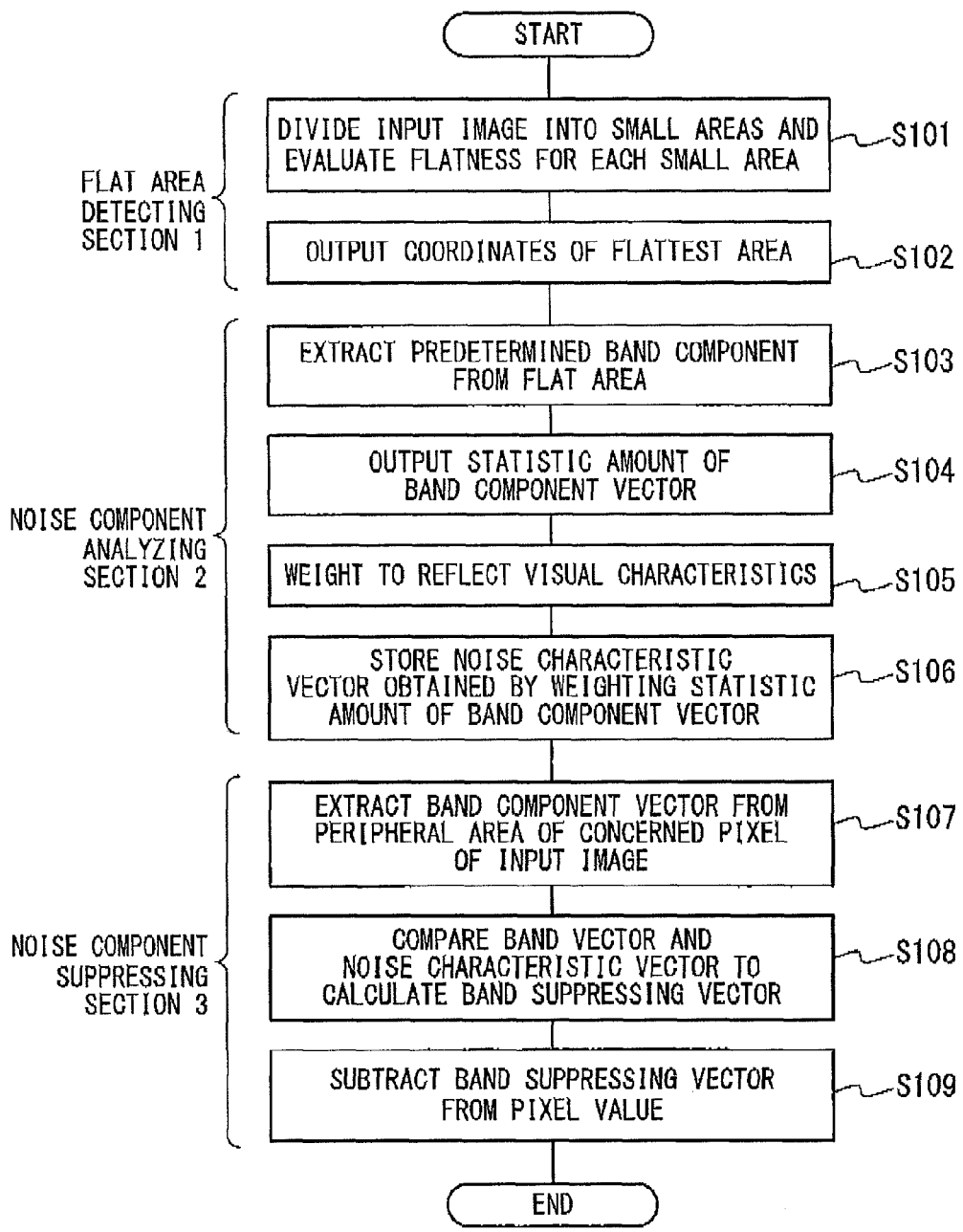
FIG. 3 is a flowchart showing an operation of the first exemplary embodiment of the present invention.

Referring to FIG. 3, an outline of an operation of the first exemplary embodiment of the present invention will be described.

(1) Step S101

The flatness evaluating section 11 divides an input image into a plurality of small areas, and evaluates the flatness in each small area.

(2) Step S102

The flat area coordinate calculating section 12 calculates the flatness index of each small area, and outputs a coordinate value of an area where the flatness index is the smallest as a flat area coordinate.

(3) Step S103

The band component extracting section 21 extracts predetermined band components (the band component vector) by applying the frequency band filters for the number determined in advance, to the flat area.

(4) Step S104

The statistic amount calculating section 22 finds a maximum value of absolute values of the band component vectors for every band, and outputs obtained maximum absolute value as a band component vector statistic amount.

(5) Step S105

The visual characteristic weighting section 23 performs weighting to reflect a visual characteristic for each band. The weighting is carried out in a range from 0 to 1.

(6) Step S106

The visual characteristic weighting section 23 outputs the noise characteristic vector obtained by weighting to the band vector statistic amount and stores it in the noise characteristic vector storage section 24.

(7) Step S107

The band component extracting section 31 extracts the band component vector for a peripheral area of a concerned pixel by scanning an input image. For the band filter used here, the same filter as used in the band component extracting section 21 for the noise analysis shall be used.

(8) Step S108

The band suppression vector calculating section 32 calculates the band suppression vector by comparing the band component vector in the concerned pixel and the noise characteristic vector stored in the noise characteristic vector storage section 24.

(9) Step S109

The pixel value correcting section 33 subtracts a band suppression vector from the concerned pixel value (a pixel value of the concerned pixel), and sends out an output image. As an example of the concerned pixel value (the pixel value of the concerned pixel), a brightness value or a RGB value may be considered.

Figures 4, 5:
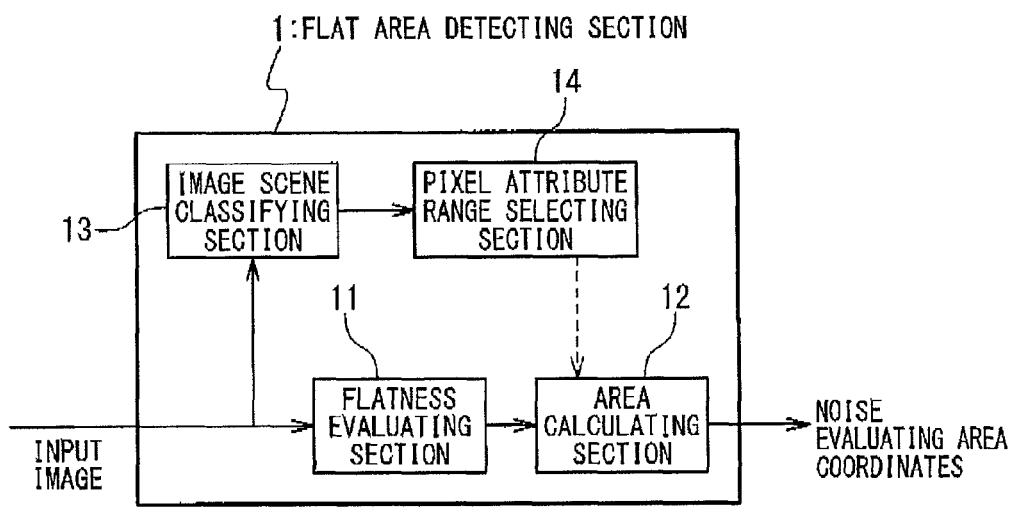
FIG. 4 is a block diagram showing a configuration of a second exemplary embodiment of the present invention.
FIG. 5 is a diagram showing an example of an attribute table classified by category.

Next, a second exemplary embodiment of the present invention will be described in detail referring to drawings. Referring to FIG. 4, in the second exemplary embodiment of the present invention, the flat area detecting section 1 includes a flatness evaluating section 11, the flat area coordinate calculating section 12, an image scene classifying section 13, and a pixel attribute range selecting section 14.

An operation of the flatness evaluating section 11 in FIG. 4 is the same as that of the flatness evaluating section 11 of FIG. 1, and calculates a flatness index. The image scene classifying section 13 classifies the input image into one of several categories according to its pattern. As examples of the categories, there are a portrait, scenery, a night view, a flower, a backlight, etc. For example, the image scene classifying section 13 extracts the feature amounts of color, texture, etc. from the image and compares them with dictionary data classified for every category prepared in advance. Thus, the image is classified into one of the categories that is nearest to dictionary data. The image scene classifying section 13 outputs a category number z to which the input image belongs.

The pixel attribute range selecting section 14 refers to a table held in advance to output an attribute corresponding to the category number z. FIG. 5 shows an example of an attribute table. FIG. 5, as examples of the attributes of the category, the table records maximum values and minimum values of hue H, chroma S, and brightness V. The flat area coordinate calculating section 12 calculates a coordinate of an area where the flatness index S is the smallest, among areas that satisfies the attributes.

The flat area detecting section 1 can change a flat area to be searched according to an image scene. For example, when the image is a night view, the flat area coordinate calculating section 12 may be instructed to search only an area whose brightness is low, since it is desirable to evaluate a noise of a dark area. Similarly, when the image is a portrait, it is desirable to search an image with a concentration in flesh color. Dynamic change of these search ranges can be realized by preparing a table of the attributes for every specific image scene in the pixel attribute range selecting section 14 in advance.

An operation of the flat area detecting section 1 in the second exemplary embodiment of the present invention will be described referring to FIG. 6.

(1) Step S201

The flatness evaluating section 11 divides an input image into a plurality of small areas, and evaluates the flatness for each small area.

(2) Step S202

The image scene classifying section 13 classifies the input image into one of several categories according to its pattern, and outputs the category number to which the input image belongs.

(3) Step S203

The pixel attribute range selecting section 14 refers to a table prepared in advance to output the attributes corresponding to the category number z.

(4) Step S204

The flat area coordinate calculating section 12 calculates the coordinate value of an area where the flatness index is the smallest, among the areas satisfying the attribute values, and outputs the calculated coordinate value of the area having the smallest flatness index as a flatness area coordinate (noise evaluation area coordinate).

Here, the flat area coordinate calculating section 12 outputs the noise evaluation area coordinate, and supplies it to the band component extracting section 21. The processes following the process of the band component extracting section 21 are the same as those of the first exemplary embodiment.

As described above, the noise reducing apparatus of the present invention can realize optimal noise reduction according to the category of the pattern of the image.

The noise reducing apparatus of the present invention includes the flat area detecting section, the noise component analyzing section, and the noise component suppressing section. The flat area detecting section detects the flat area from the image. The noise component analyzing section analyzes the noise component from the flat area. The noise component suppressing section suppresses the noise based on the result of the noise component analyzing section. Moreover, the noise component analyzing section includes a band component extracting section for extracting a frequency band component. Here, the noise component suppressing section controls a suppression amount depending on the frequency band component. For example, the noise component suppressing section sets the noise frequency band component to an upper limit of the suppression amount.

At this time, the noise component suppressing section extracts a concerned pixel frequency band component obtained by analyzing a surrounding spatial frequency component in the concerned pixel of the input image. When the concerned pixel frequency band component is smaller than or equal to the noise frequency band component, the concerned pixel frequency band component is set to an upper limit of the suppression amount. In the case where the concerned pixel frequency band component is larger than the noise frequency band component, the noise frequency band component is set to the upper limit of the suppression amount. In addition, the frequency band component may be a frequency band component in a different direction. Moreover, the frequency band component may be a frequency band component in a different color component.

It should be noted that there is a case where the noise component analyzing section includes a band component extracting section for extracting a band component, and a visual characteristic weighting section for weighting the band component based on a visual characteristic. There is a case where the flat area detecting section includes an image scene classifying section for classifying a category of the pattern of the input image.

In the noise reducing method of the present invention, first, the flat area is detected from the image, and then the noise frequency band component is extracted by filtering a specific spatial frequency component that was determined in advance from the flat area. Next, the noise component of the input image is suppressed by using the noise frequency band component. Here, when suppressing the noise component, the suppression amount is controlled according to the noise frequency band component. For example, at a step of suppressing the noise component of the input image, the noise frequency band component is set to an upper limit of the suppression amount.

At this time, when suppressing the noise component of the input image, the concerned pixel frequency band component obtained by analyzing a spatial frequency component of the peripheral pixels in the concerned pixel of the input image is extracted. In the case where the concerned pixel frequency band component is smaller than or equal to the noise frequency band component, the concerned pixel frequency band component is set to the upper limit of the suppression amount. When the concerned pixel frequency band component is larger than the noise frequency band component, the noise frequency band component is set to the upper limit of the suppression amount. It should be noted that the frequency band component may be a frequency band component in a different direction. Moreover, the frequency band component may be a frequency band component in a different color component.

When extracting the noise frequency band component, there is a case where the extracted frequency band component is weighted based on a visual characteristic. Moreover, when detecting the flat area from the image, there is a case where the category of the pattern of the input image is classified.

According to the present invention, a natural noise-reduced image can be obtained without discontinuity of a straight line and pictorial unnaturalness. Moreover, a noise-reduced image with high resolution feeling can be obtained, in which blurring of an edge portion is suppressed. This is because the noise component in the image can be accurately estimated according to the image and thereby a correction amount in each pixel can be optimized.

The invention claimed is:

1. A noise reducing apparatus comprising:
at least one processor;
a flat area detecting section implemented by the at least one processor to detect a flat area from an image;
a noise component analyzing section implemented by the at least one processor to extract a noise frequency band component from said flat area, by filtering a predetermined specific spatial frequency component; and
a noise component suppressing section implemented by the at least one processor to suppress a noise component of said image based on said noise frequency band component,
wherein said noise component analyzing section comprises:
an flat area band component extracting section configured to extract a band component vector from said flat area by applying a frequency band filter for a predetermined number;
a statistic calculating section configured to find the band component vector with a maximum value of absolute values from the band component vectors for predetermined pixels for every band and output the maximum absolute value as a band component vector statistic amount;
a visual characteristic weighting section configured to output a noise characteristic vector obtained by performing weighting on said band vector statistic amount to reflect a visual characteristic; and
a noise characteristic vector storing section configured to store said noise characteristic vector, and
wherein said noise component suppressing section comprises:
a concerned pixel band component extracting section configured to scan said image and extract the band component vector to a peripheral area of a concerned pixel;
a band suppression vector calculating section configured to calculate a band suppression vector by comparing said noise characteristic vector and said band component vector of said concerned pixel; and
a pixel value correcting section configured to subtract said band suppression vector from a pixel value of said concerned pixel.

2. The noise reducing apparatus according to claim 1, wherein said flat area detecting section comprises:
a flatness evaluating section configured to divide said image into a plurality of small areas and evaluate a flatness of each of the plurality of small areas; and
a flat area coordinate calculating section configured to search the flattest area from the plurality of small areas based on said flatness and output a coordinate of the flattest area.

3. The noise reducing apparatus according to claim 2, wherein said flat area detecting section further comprises:

an image scene classifying section configured to classify said image into one of categories based on to a pattern and output a category number to which said image belongs; and an image attribute range selecting section configured to output attributes corresponding to said category number.

4. The noise reducing apparatus according to claim 1, wherein said noise component suppressing means section sets said noise frequency band component as an upper limit of a suppression amount.

5. The noise reducing apparatus according to claim 1, wherein the flat area detecting section implemented by the at least one processor divides the image into partial areas and calculates a flatness index value for each one of the partial areas, the flatness index value being determined by the pixel value of the respective one of the partial areas, and wherein the flat area detecting section detects the flat area, from among the partial areas, using the flatness index value.

6. The noise reducing apparatus according to claim 5, wherein the flatness index indicates a degree of variation in pixel value of pixels comprised in the respective one of the partial areas, and wherein the flat area detecting section implemented by the at least one processor calculates a flattest area based on the flatness index of each of the partial areas, the flattest area being the respective one of the partial areas having the smallest flatness index.

7. The noise reducing apparatus according to claim 5, wherein the flat area is the partial area with the smallest flatness index.

8. A noise reducing apparatus comprising:
at least one processor;
a flat area detecting section implemented by the at least one processor to detect a flat area from an image;
a noise component analyzing section implemented by the at least one processor to extract a noise frequency band component from said flat area, by filtering a predetermined specific spatial frequency component; and
a noise component suppressing section implemented by the at least one processor to suppress a noise component of said image based on said noise frequency band component,
wherein said noise component suppressing section extracts a concerned pixel frequency band component obtained by analyzing a spatial frequency component in neighborhood of a concerned pixel of said image, sets said concerned pixel frequency band component as an upper limit of a suppression amount, when said concerned pixel frequency band component is equal to or lower than said noise frequency band component, and sets said noise frequency band component as the upper limit of the suppression amount, when said concerned pixel frequency band component is higher than said noise frequency band component.

9. A non-transitory computer-readable recording medium in which a computer-executable program code is stored to allow a computer to execute a method which comprises:
detecting a flat area from an image;
extracting a noise frequency band component from said flat area by filtering a predetermined specific spatial frequency component;
suppressing a noise component of said image based on said noise frequency band component;
extracting a concerned pixel frequency band component obtained by analyzing a spatial frequency component in neighborhood of a concerned pixel of said image;
setting said concerned pixel frequency band component as an upper limit of a suppression amount, when said concerned pixel frequency band component is equal to or lower than said noise frequency band component; and
setting said noise frequency band component as the upper limit of the suppression amount, when said concerned pixel frequency band component is higher than said noise frequency band component.

10. The non-transitory computer-readable recording medium according to claim 9, wherein said method further comprises:
classifying said image into one of categories based on a pattern when detecting said flat area.

11. The non-transitory computer-readable recording medium according to claim 9, wherein said method further comprises:
performing weighting on said noise frequency band component based on visual characteristic when extracting said noise frequency band component.

12. The non-transitory computer-readable recording medium according to claim 9, wherein said method further comprises:
setting said noise frequency band component as an upper limit of a suppression amount when suppressing said noise component.

13. The non-transitory computer-readable recording medium according to claim 9, wherein said method further comprises:
setting a frequency band component for a direction as said noise frequency band component.

14. The non-transitory computer-readable recording medium according to claim 9, wherein said method further comprises:
setting a frequency band component for a color component as said noise frequency band component.

15. A noise reducing method comprising:
detecting a flat area from an image;
extracting a noise frequency band component from said flat area by filtering a predetermined specific spatial frequency component;
suppressing a noise component of said image based on said noise frequency band component;
extracting a concerned pixel frequency band component obtained by analyzing a spatial frequency component in neighborhood of a concerned pixel of said image; and
setting said concerned pixel frequency band component as an upper limit of a suppression amount, when said concerned pixel frequency band component is equal to or lower than said noise frequency band component; and
setting said noise frequency band component as the upper limit of the suppression amount, when said concerned pixel frequency band component is higher than said noise frequency band component.

16. The noise reducing method according to claim 15, further comprising:
classifying said image into one of categories based on a pattern when detecting said flat area.

17. The noise reducing method according to claim 15, further comprising:
performing weighting on said noise frequency band component based on visual characteristic when extracting said noise frequency band component.

18. The noise reducing method according to claim 15, further comprising:
setting said noise frequency band component as an upper limit of a suppression amount when suppressing said noise component.

19. The noise reducing method according to claim 15, further comprising:
   setting a frequency band component for a direction as said noise frequency band component.

20. The noise reducing method according to claim 15, further comprising;
   setting a frequency band component for a color component as said noise frequency band component.

* * * * *